(12) United States Patent
Bentrim

(10) Patent No.: US 7,374,382 B2
(45) Date of Patent: May 20, 2008

(54) ROTATABLE CAPTIVATED NUT

(75) Inventor: Brian G Bentrim, Doylestown, PA (US)

(73) Assignee: Pem Management, Inc., Wilmington, DE (US)

( * ) Notice: Subject to any disclaimer, the term of this patent is extended or adjusted under 35 U.S.C. 154(b) by 0 days.

(21) Appl. No.: 11/163,685

(22) Filed: Oct. 27, 2005

(65) Prior Publication Data

US 2006/0099047 A1 May 11, 2006

Related U.S. Application Data

(60) Provisional application No. 60/625,094, filed on Nov. 5, 2004.

(51) Int. Cl.
*F16B 37/04* (2006.01)

(52) U.S. Cl. .................... 411/180; 711/533; 711/999

(58) Field of Classification Search ........... 411/533, 411/180, 181, 183, 999
See application file for complete search history.

(56) References Cited

U.S. PATENT DOCUMENTS

| | | | | |
|---|---|---|---|---|
| 3,000,420 A | * | 9/1961 | Spokes | 411/180 |
| 3,238,581 A | * | 3/1966 | Sawyer | 24/71 T |
| 4,370,794 A | * | 2/1983 | Bien et al. | 29/509 |
| 4,969,788 A | * | 11/1990 | Goiny | 411/428 |
| 5,431,517 A | * | 7/1995 | Hoelle et al. | 411/183 |
| 5,842,894 A | * | 12/1998 | Mehlberg | 439/801 |
| 5,975,821 A | | 11/1999 | Kue | |
| 6,220,801 B1 | * | 4/2001 | Lin | 411/9 |
| 6,486,402 B2 | | 11/2002 | Harger et al. | |
| 6,817,815 B2 | * | 11/2004 | Ross | 411/180 |
| 6,866,456 B2 | | 3/2005 | Bentrim | |
| 6,932,044 B1 | * | 8/2005 | Fenech | 123/195 C |

* cited by examiner

*Primary Examiner*—Flemming Saether

(57) ABSTRACT

A captive clinch nut may be rotatably attached to an apertured sheet. The nut includes a body having an axial threaded bore and a flange forming a base of the nut body. The flange includes a surface on a bottom side thereof preferably unitary therewith for providing a bearing surface of reduced friction against the sheet. A displacer unitary with the nut body is located directly below the flange and has an outside diameter less than an outside diameter of the flange. A tubular flared shank unitary with the nut body extends coaxially from the displacer, and includes a neck immediately adjacent the displacer with an outside diameter less than the outside diameter of the displacer forming an undercut area between the outside of the shank and an underside of the displacer for receiving the cold flow of metal of the sheet.

15 Claims, 1 Drawing Sheet

ROTATABLE CAPTIVATED NUT

RELATED APPLICATIONS

The present application is related to provisional patent application Ser. No. 60/625,094 entitled "Rotatable Captivated Nut" filed on Nov. 5, 2004, priority from which is hereby claimed.

FIELD OF THE INVENTION

The present invention relates to fasteners which are captivated in a sheet of material yet are free to rotate so that they may engage another member. More specifically, it relates to a tool-rotatable captivated fastener which is captivated by a sheet of metal which is deformed during the clinch attachment process.

BACKGROUND OF THE INVENTION

There is a need in the fastening industry for a nut that is captive similar to existing clinch nuts, but may still be turned to engage a screw or bolt to provide a clamp load. In one case, this is needed so that a captive and stationary stud can be used in conjunction with a captive nut. This allows both mating components, the stud and the nut, to be captive in a sheet. The benefit of the captive components include elimination of loose hardware, reduction of BOM inventories, ease of manufacturing and assembly and cost reductions.

It is known to provide a captive rotatable nut in a sheet by flaring the shank of the nut within a washer on the opposite side of the sheet as shown for example in U.S. Pat. No. 6,866,456. This configuration, however, requires a specialized anvil to be located on the opposite side of the sheet and a clamp load cannot be applied directly to the back side of the sheet because of the presence of the washer. Also, simple stake nuts are known that include an extending shank which is deformed against the back side of the sheet. This also requires a second installation component, i.e. an anvil, and does not provide a flush attachment. The present invention solves the problems posed by these undesirable characteristics of the prior art.

SUMMARY OF THE INVENTION

The device is a clinching nut without an anti-torque feature unlike the prior art which includes sheet-gripping structures to provide rigid attachment. The shank of the clinch nut includes a displacer and an undercut, but no anti-torque features such as knurl-type serrations are included. In this regard, a smooth surfaced shank extends from a flange of the nut. The flange provides a bearing surface that is free of projections and irregularities that could impair the rotation of the nut or disturb the surface of the substrate. The head of the nut may be of any shape. A hex is recommended as a convenient nut shape because of the commonality of the design. A standard hex shape above the flange allows common wrenches and sockets to engage and turn the nut, however other shapes may also be applied. For example a circle with two flats, an acorn nut, or a more exotic shape could be utilized. The height of the head should be sufficient to provide the desired nut strength. Material choice of the nut is important for the design to function correctly. Because the part must clinch, the hardness of the part must be sufficient to cause yielding of the substrate panel. These issues are common with other clinching fasteners and should be apparent to one skilled in the art.

More specifically, the applicant has devised a captive clinch nut for rotatable attachment to an apertured sheet comprising a nut body having an axial threaded bore, and a flange forming a base of the nut body. The flange includes a surface on a bottom side thereof preferably unitary therewith for providing a bearing surface of reduced friction against the sheet. A displacer unitary with the nut body is located directly below the flange and has an outside diameter less than an outside diameter of the flange. A tubular flared shank unitary with the nut body extends coaxially from the displacer, and includes a neck immediately adjacent the displacer with an outside diameter less than the outside diameter of the displacer forming an undercut area between the outside of the shank and an underside of the displacer for receiving the cold flow of metal of the sheet. The outer surfaces of the displacer and the shank are of reduced friction for providing a bearing surface of the nut against the inside wall of the aperture in the sheet. The side surface of the displacer is preferably tapered inwardly. The captive nut is used with a sheet wherein the displacer and shank of the nut body are located within the sheet and are coaxial with the aperture such that a portion of the sheet lies within an undercut area located between the bottom of the displacer and the outside surface of the shank. A space between the outside surfaces of the displacer and the flange and an inside wall of the sheet aperture is such that the nut is freely rotatable within the sheet while being secured against substantial axial displacement therefrom. Preferably, the width of the displacer and the length of the shank are less than the thickness of the sheet such that the shank does not extend beyond a back side surface of the sheet. The nut is used with a relatively ductile sheet material such that the flange remains relatively non-deformable and is composed of a material having a hardness substantially greater than that of the sheet.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

DESCRIPTION OF THE PREFERRED EMBODIMENT

Figure 1:
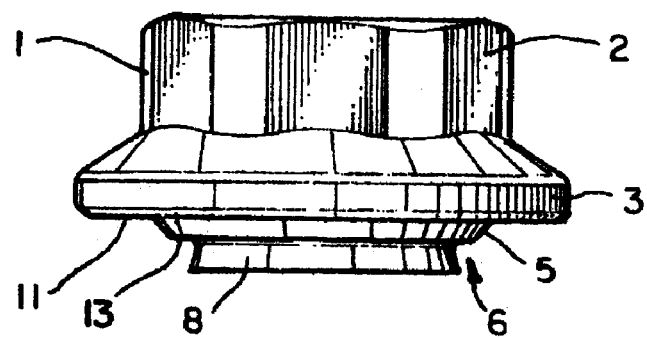
FIG. 1 is a front view of the invention.

Referring now to FIG. 1, the fastener of the invention is in the form of a nut including a head 1 which includes tool-engaging flats 2 for applying a rotational torque to the nut. A hexagonal configuration is preferred for the tool-engaging surfaces. The nut further includes a flange 3 which has a smooth bottom face 11 which serves as a first bearing surface against a sheet (shown in FIG. 3) into which the nut is installed. The nut is installed by the clinch process in which a lower shank portion 8 is provided with a displacer 5 and an undercut 6. The displacer is tapered inwardly. The shank of the nut is placed through an aperture in the sheet, and when the nut is pressed into a sheet of sufficiently ductile material, the displacer including bottom surface 13 forces a cold flow of sheet material into the undercut area 6, thus attaching the nut to the sheet.

Figure 2:
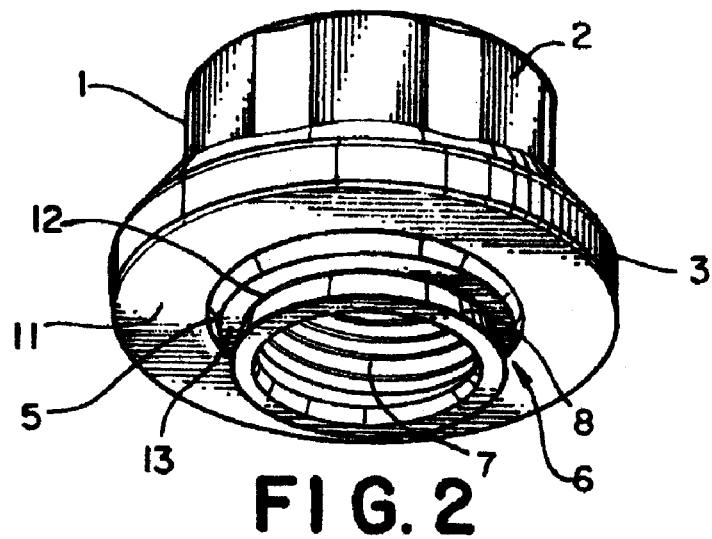
FIG. 2 is a bottom isometric view.

As shown in FIG. 2, undercut feature 6 which begins at a neck 12 of said shank lies immediately below said displacer bottom surface 13. Internal threads of the nut 7 extend the entire length of the nut. Tubular shank 8 and the outer surface of displacer 5 are smooth surfaced and are of reduced friction to enhance their function as bearing surfaces in addition to the bottom face 11 of the nut flange 3.

Figure 3:
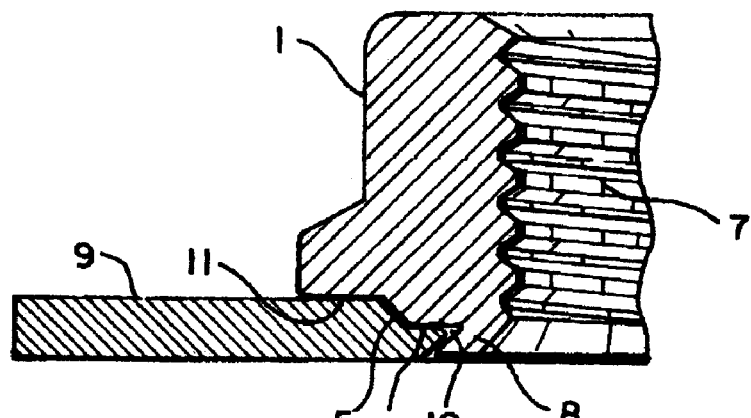
FIG. 3 is an elevation partial section view.

Referring now to FIG. 3, the nut is installed in a sheet 9 which has an aperture diameter and thickness sized in relation to the dimensions of the nut shown in FIGS. 1 and 2 such that the cold flow of metal of the sheet is not tightly compressed against the outer surfaces of the displacer or the flange. Space 10 between the sheet and the nut enables the nut to freely rotate within the sheet 9 while providing significant pull-out resistance due to the cold flow of material of the sheet forced into the undercut area between the flared shank 8 and the displacer 5 by displacer bottom surface 13. Bottom face 11 of flange 3 bears against the top surface of sheet 9 and surface 11 is a smooth surface of reduced friction to enhance its performance.

It should be understood that there may be other modifications and changes to the present invention that will be obvious to those of skill in the art from the foregoing description, however, the present invention should be limited only by the following claims and their legal equivalents.

What is claimed is:

1. A captive clinch nut for rotatable attachment to an apertured sheet, comprising:
   a nut body having an axial threaded bore;
   a first bearing surface on a base of said nut body;
   an annular displacer collar unitary with said nut body and located directly below said bearing surface, the displacer collar inwardly tapered along its entire outside surface and having an outside diameter less than an outside diameter of said first bearing surface, and a second load-bearing surface on a bottom side of said displacer collar parallel to said first bearing surface;
   a rigid tubular shank being substantially non-deformable in its unattached free state prior to assembly, unitary with said nut body, and coaxially extending from said displacer, said shank being outwardly flared toward a distal end along its entire length; and
   wherein a neck of said shank immediately adjacent said displacer has an outside diameter less than the outside diameter of said displacer and less than an outside diameter of said flared end; and
   an undercut between said shank and said displacer, said undercut adapted to receive only a partial cold flow of metal of said sheet.

2. The captive clinch nut of claim 1 further including an outwardly extending flange forming the base of said nut body.

3. An assembly of parts including the captive nut of claim 1 and further including the sheet having the aperture formed therein, the displacer and shank of said nut body being located wholly within said sheet and being coaxial with said aperture such that a ductile deformed portion of said sheet lies within the undercut; and
   a space between said shank and an inside wall of said sheet aperture such that the nut is freely rotatable within said sheet while being secured against substantial axial displacement therefrom.

4. The assembly of parts of claim 3 caused by pressing said nut into the aperture of said sheet being supported by a featureless flat surface. forming the base of said nut body.

5. The assembly of parts of claim 3 wherein the combined lengths of said displacer and said shank are less than the thickness of said sheet such that said shank does not extend beyond a back side surface of said sheet.

6. The assembly of parts of claim 5 wherein said nut is composed of a material having a hardness substantially greater than said sheet.

7. The assembly of parts of claim 6 wherein the portion of said sheet which lies within said undercut area is received therein by the cold flow of metal of said sheet.

8. The captive clinch nut of claim 2 further including a head portion having tool-engaging flats on its outer surface.

9. The captive clinch nut of claim 8 wherein said head is of hexagonal cross-section.

10. The captive clinch nut of claim 9 wherein said threaded bore extends through the entire length of the nut.

11. The captive clinch nut of claim 1 wherein the outer surfaces of said displacer and said shank are of reduced friction for providing bearing surfaces of said nut against said sheet.

12. The captive clinch nut of claim 1 wherein said first bearing surface is integral with said nut body.

13. An assembly of parts including the captive nut of claim 1 and further including a sheet having an aperture formed therein, the displacer and shank of said nut body being located wholly within said sheet aperture and being coaxial therewith such that a ductile deformed portion of said sheet lies within the undercut; and
   a space between outside surfaces of said shank and an inside wall of said sheet aperture such that the nut is freely rotatable within said sheet while being secured against substantial axial displacement therefrom, wherein the combined lengths of said displacer and said shank are less than the thickness of said sheet such that said shank does not extend beyond a back side surface of said sheet.

14. The assembly of parts of claim 13 wherein said nut is composed of a material having a hardness substantially greater than said sheet.

15. The assembly of parts of claim 14 wherein the portion of said sheet which lies within said undercut area is received therein by the cold flow of metal of said sheet.

* * * * *